United States Patent Office 3,581,379
Patented June 1, 1971

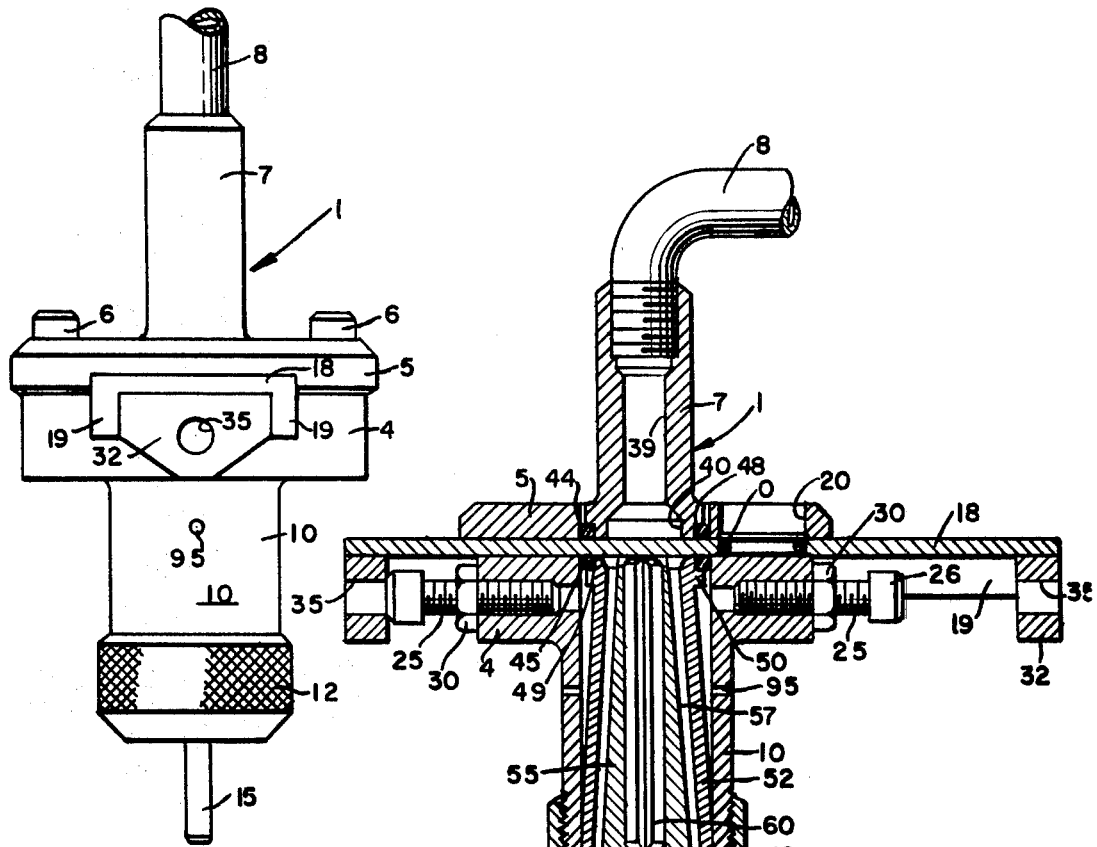
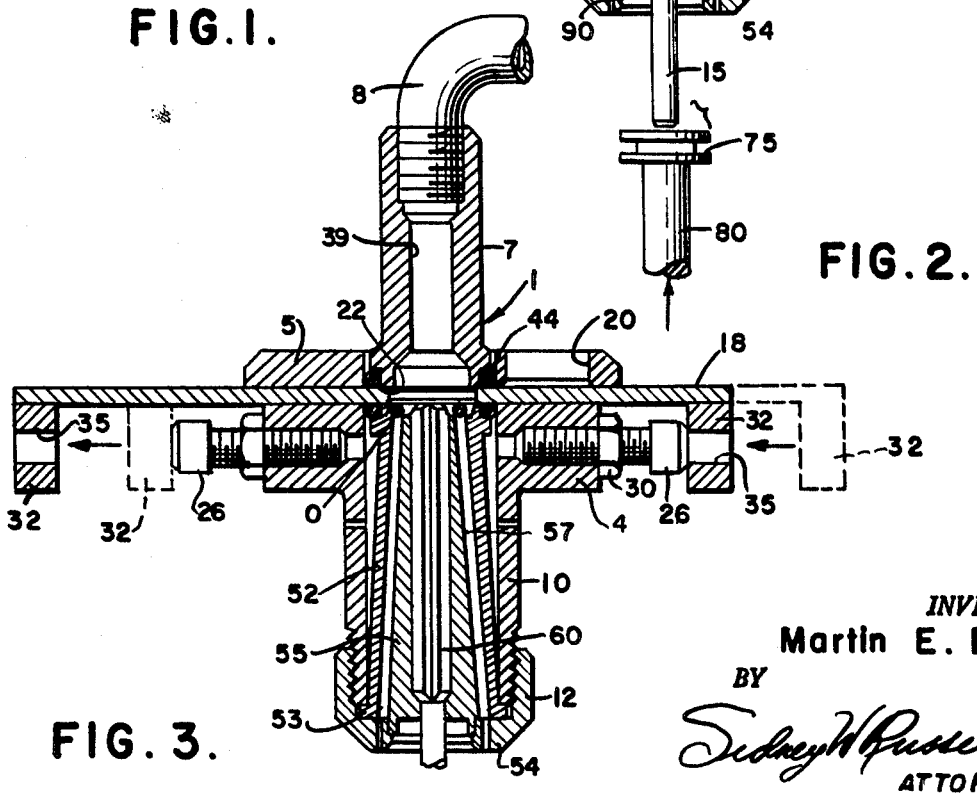
FIG.1.  FIG.2.  FIG.3.
INVENTOR.
Martin E. Drobilits
BY
Sidney W. Russell
ATTORNEY

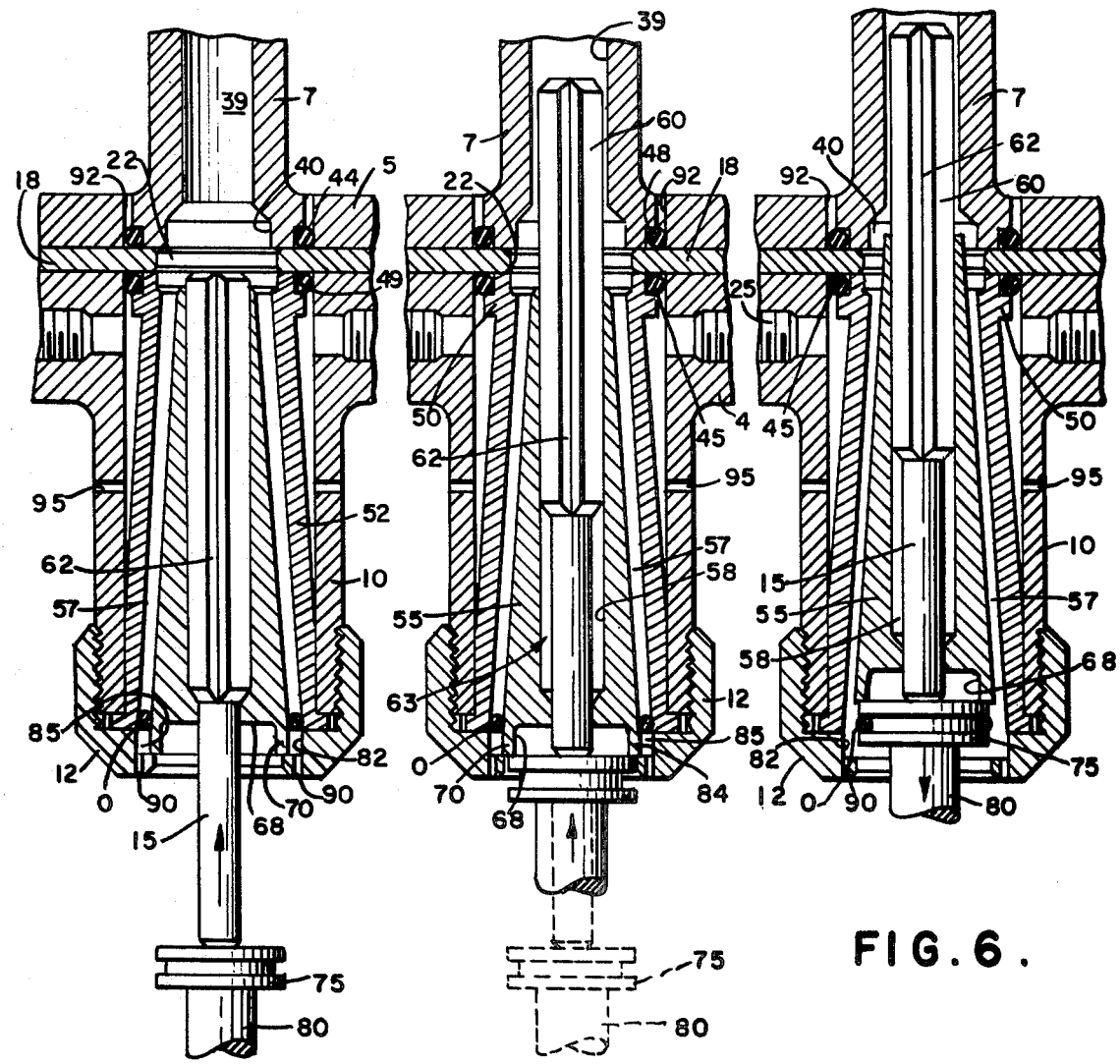

3,581,379
PNEUMATIC O-RING APPLICATOR AND METHOD
Martin E. Drobilits, 1827 Cedar Ave.,
Mountainside, N.J. 07092
Filed Dec. 5, 1967, Ser. No. 691,681
(Filed under Rule 47(b) and 35 U.S.C. 118)
Int. Cl. B23p 11/02
U.S. Cl. 29—450                                  10 Claims

ABSTRACT OF THE DISCLOSURE

A device adapted for semi or full automatic operation for the positioning of O or retaining rings upon grooved shafts, pins and the like, wherein the said rings are fed to a reciprocating shuttle which successively feeds the same over a conical, continuously expanding passageway, and pneumatic pressure applied through said passageway causes the rings to expand to the required distance to snap into the grooves of the receiving objects, the latter being sequentially fed in timed sequence to the largest and egress end of the passageway.

---

This invention relates to a semi or fully automatic device for the application to grooved elements of almost any type what is commonly referred to in the art as O rings, or circular configurations of an elastic type. The latter are commonly used as sealing rings, bushings, and have many other uses and applications which are well known to those skilled in the art. More particularly, the invention relates to a device of this general nature that functions to place the ring on a grooved object pneumatically, eliminating many of the complexities involved in known arrangements to achieve this purpose, and accomplishing such function with extreme ease, rapidity and by means of a mechanical arrangement that represents the essence of simplicity.

Heretofore mechanisms for this purpose have usually been manually operated or hand manipulated with the obvious disadvantage of waste in labor and time costs.

There also have been proposals such as that illustrated in Pat. No. 2,814,858, involving mechanically driven components to eliminate the hand operation. However, these, in large part, require relatively complex types of mechanical arrangements necessitating a plurality of moving parts, with consequent intricacy of construction and other factors which detract from the practicality of such devices, or at least demonstrate that the present arrangement, by reason of the simplified concept which is here involved, is far superior as a solution to the specific problems which revolve about emplacement of that type of gasket or O ring which is here contemplated.

With regard to the instant invention, and as indicated, the entire movement of the ring is accomplished through the effect of pneumatic force, applied successively to a rapid succession of O rings. Air pressure behind the ring forces it over a cone or frustrum beginning at the smaller end thereof and progressing to the larger end thereof, so that the ring is gradually expanded to the size enabling it to "snap upon" the grooved object, once the cone shaped mandrel is vertically moved in the direction of the smaller end thereof, enabling such positioning. A reciprocating shuttle successively picks up the O rings and sequentially feeds them into the path of a pressurized air stream and, intercepting the latter, air pressure forces each one of the rings in an extremely rapid fashion over the mandrel, expanding it and, as stated, permitting it to snap on the grooved object when the latter is raised into contacting position with the lower end of the mandrel.

The entire operation is one involving the use of but very few mechanically movable parts—the sliding shuttle which accepts and ejects the O ring successively into the path of the air stream; the movable and conically shaped mandrel which permits the O ring, due to air pressure, to be gradually expanded thereover; and the means for thrusting the grooved object against the lower or larger end of the mandrel so that the O ring, which is positioned finally at that end, is rapidly snapped into the groove of the said object.

The sliding or reciprocating feed device is readily operated in timed relationship with the operaton of air pressurizing and depressurizing of the expanding passageway through which the O ring travels. Also, the instrument or means used to force the grooved object against the bottom of the mandrel is similarly operated in timed sequence with air pressure emission and shuttle reciprocation. The interrelated means for accomplishing this timing of the shuttle and grooved object feed means in proper relationship with each other is not herein shown or described; however, such means, electrical, hydraulic or mechanical, are well known to and can be easily arranged by those skilled in the art, once the heart of the instant invention be disclosed, as in the following.

It is, therefore, a primary object of the instant invention to provide a semi or fully automatic device for the seating of such articles as O rings into a grooved object, and to accomplish this by means of air under pressure applied to the ring, causing it to expand over a mandrel of cone shape so as to be in a position to interlock with the grooved object when the latter intersects the bottom or enlarged portion of the cone.

It is another object of the invention to provide a device of the referred to nature wherein the path of compressed air is confined along the surface of the cone and within a narrow, cone shaped passageway in which the O ring, or similar element is initially positioned. The force of pneumatic pressure is thus applied directly to the upper surface of the ring, driving it downwardly and toward the enlarged end of the cone so as to expand it to a diameter sufficiently large to encompass the grooved object.

Another object of the invention is to provide a means of the described type where, in essence, there are only three moving parts, and these as follows: A reciprocating shuttle for sequential pickup of one of a series of rings to be emplaced; a movable mandrel, cone shaped in configuration, over which the rings are forced by the action of air under pressure; and a movable or reciprocable guide pin employed to position the said coned mandrel in axial alignment with the rings so as to sequentially receive the latter in rapid succession. Such minimal number of mechanical movements required by the instant mechanism represents, in this regard, a vast and practical differentiation over previous endeavors to obtain the same function by employment of mechanical combinations involving many and complex moving and co-acting elements.

In line with the foregoing, a further fundamental object of the invention is to provide such a device of the type wherein this substantial reduction in the number of elements needed to achieve the desired function leads not only to utter simplicity of operation, but is manifestly conducive to economy of fabrication of the invention, and economy of repair or replacement thereof. In the same vein, although a given unit is designed to achieve the seating of such as O rings of definite size upon grooved elements also of a certain and definite size, this very simplicity of the mechanical combination of the invention enables the manufacture of other different sized units which can accommodate different sizes of O rings, in a practical commercial and economically feasible manner.

Further objects and advantages of the invention should be apparent to those skilled in the art from the following more detailed description thereof, having reference to the several appended drawings of the invention, and wherein:

FIG. 1 is a side elevation view of the external configuration of the invention or of the casing or housing enclosing the working parts thereof;

FIG. 2 is a section view of the invention as shown in FIG. 1, particularly depicting the shuttle in a position for receiving an individual O ring, here also shown in place in the appropriate aperture in the shuttle for this purpose;

FIG. 3 is a section view similar to FIG. 2 but illustrating the shuttle in its position of furthest travel, i.e., with the referred to opening therein being positioned immediately under the air jet with, as a consequence, the O ring being forced out of the opening in the shuttle and commencing to engage the upper edge of the cone for transport to its point of discharge;

FIG. 4 is an enlarged view, partially in section, of the position of the shuttle as shown in FIG. 3, but with the O ring being pneumatically forced to a point near the opposite end of the mandrel or cone;

FIG. 5 is an enlarged sectional view similar to FIG. 4 but showing the grooved object thrust upwardly by suitable means into contact with the lower edge of the mandrel, and immediately underneath the ring, with the mandrel guide being thrust upwardly to permit this motion; and FIG. 6 is a view similar to FIG. 5, in enlarged cross section, and further illustrating the continuing movement of the grooved object upwardly so as to likewise force the mandrel upwardly, this movement being such that the O ring is maintained in its same position as shown in FIG. 5, but with the groove of the grooved object being opposite thereto, the O ring finally being quickly snapped into place in said groove of the object, and as shown in this figure.

Referring more particularly to these figures, FIG. 1 depicts the exterior appearance and housings for the internal structure of the device, these consisting of a lower main housing 4 and an upper housing 5, the two housings being secured together by the use of the usual bolts 6.

This upper housing 5 has a tubular extension 7 extending upwardly, the latter for the purpose of engagement with a pneumatic line 8.

The lower housing 4 also terminates in a circular extension or tubular formation 10 within which is mounted the reciprocable cone element utilized for the purpose of expansion of the rings O, and as will be later described. When the term O ring is here referred to, it is to be understood that the invention is useful for the seating of any annular-like, resilient object of almost limitless configuration, as round, oval, triangular, square, et cetera, with obvious modification of the apparatus to accommodate configurations other than circular or round.

In any event, such cone is maintained in an axial position with the housing 10 by the guide pin 15. The lower extension 10 of the housing 4 is capped by the externally knurled and threaded element 12, the latter also serving an additional function, to be hereinafter described.

It is to be noted that the actual dimension of the unit is that shown in FIGS. 1 to 3 on page 1 of the appended drawings (a one inch to one inch scale), this illustrating the dimunitive size of the entire assembly. Naturally that size can be altered in accordance with requirements and to accommodate larger sized O rings. However, the principle of construction and operation would remain the same.

At any rate, referring to FIG. 2, it is seen that the reciprocating feed member, here identified as shuttle 18, is adapted to sequentially receive individual O rings as shown at 0, these being discharged from an appropriate hopper into the bore 20 (in the upper housing 5) of a size complementary to the external diameter of such rings. Similarly, the shuttle 18 is provided with an aperture 22 to permit seating of the O ring therein, as shown in this figure.

Reciprocation of the shuttle 18 from its position as shown in FIG. 2 to its position as shown in FIG. 3 is accomplished by any suitable, timed mechanism. In the instant case, since a pneumatic operation is contemplated for the positioning of the O ring upon the grooved object, an air pressure operation to also accomplish such reciprocations of the shuttle may be preferable. Also, the distance of travel laterally is controlled by suitable stops and if a pneumatic operation be employed those stops will substantially aid in accurately controlling the distance of travel so that the O ring is not only initially properly positioned in the appropriate bore 22 of the shuttle 18, but likewise will be precisely positioned immediately under the jet of air under pressure when the ring is in the position shown in FIG. 3.

Such stops are interconnected with the housing 4 and comprise opposed threaded elements 25 which are threaded into suitable threaded apertures on the opposed sides of the housing 4 and as shown in FIGS. 2 and 3. Each of the elements 25 is provided with an enlarged head 26 terminating in a flat end portion suitable for face to face engagement with the depending members 32, the latter being secured in any suitable fashion as by welding to the shuttle 18 and its side elements 19. As so mounted these stops 25 can be readily adjusted in a lateral direction so that they can be positioned the required outward distance from the casing 4, thus to limit movement of the shuttle by contact with end members 32. When so positioned at the required distance they are locked in place by a usual form of lock nut 30.

For convenience in adjustment of the stops 25, an aperture 35, smaller than the stop surfaces 26, is provided in each of the end members 32 through which a tool, such as a Phillips or hex wrench, may be inserted to engage a shape of complementary formation in the outer faces of each of these heads 26.

As before indicated, a pneumatic line 8 leads to the tubular extension 7 which is provided with a bore 39 forming a surmounting pressure chamber, the pneumatic line 8 being threaded at one end, as at 38, to engage member 7, as will be well understood.

The bore 39 terminates in an enlarged portion 40 formed in the upper housing 5, the diameter of the bore 40 being approximately the same as the outside diameter of the O ring (as well as shuttle opening 22) so that air pressure through line 8 is forced directly against the upper surface of the O ring when it is in the aligned position as shown in FIG. 3.

It will be understood that the shuttle 18, together with its side members 19, more or less in the shape of a table, slides or reciprocates within a suitable slotted area or top and side passageways (not shown) which are shaped to this same "table" configuration of the shuttle and formed in the two conjoint housing members 4 and 5. At any rate, because it is desired that air pressure be confined to a path where it will directly impinge upon the O ring, and without leakage, a circular bushing or seal 44 is positioned so as to bear upon the upper surface of the shuttle 18. A like seal 45 is similarly disposed to bear upon the lower surface of the shuttle. These seals can be made of neoprene, buna rubber, or any other natural or synthetic material having sufficient durability and elasticity to firmly bear upon such upper and lower surfaces of the reciprocating shuttle as to seal the points of contact against escape of air at such areas. These seals 44, 45 are so positioned and proportioned, however, as to permit relative freedom of movement, in a laterally reciprocating manner, of the shuttle structure 18.

It will be noted that the upper ring seal 44 is disposed in a complementary peripheral groove 48 provided in the upper housing 5, whereas the lower sealing ring 45 is positioned in a like groove 49 formed by a peripheral flange 50 which is provided at the upper end of the hollow conical member or bell element 52.

As indicated, the bell 52 is conical in structure, with a hollow interior, and provided with a lower or bottommost peripheral flange 53. This flange is tightly held between the lower rim of the extension 10 and inwardly extending lateral flange 54 of the threaded element 12. This construction is clearly illustrated in FIGS. 4 to 6 inclusive.

An additional conical member or cone 55 is placed within the bell member 52, the inner wall of the bell 52 and the outer wall or surface of the cone 55 being disposed parallel to each other and thus providing an intermediate annular channel or passageway 57 through which air under compression is permitted to flow when the shuttle is in the position shown in FIGS. 3 to 6 inclusive. The result is that the ring O has been pushed by compressed air from its initial position, as shown in FIG. 3, through the channel 57, down toward the bottom of said channel, and as so indicated, e.g., in FIG. 4.

The inner cone 55 must obviously retain its axial position, yet, for the purposes of this invention, must be subject to upward motion when the O ring is seated in the grooved object. To this end the cone 55 is appropriately bored, as at 58, to receive a guide pin 60. Such guide pin 60 is of a diameter to interfit with the bores 58 with reasonably close tolerance but permitting freedom of vertically reciprocable motion of guide pin 60 with regard to the cone 55 and for purposes which will be described.

It will be noted that the guide pin 60 is provided with one or more longitudinal grooves 62, these running longitudinally of this centering pin. These are cut into the exterior and peripheral surface thereof. The purpose of such grooves is to permit equalization of pressure upon both sides of the guide pin 60 during operation of the O ring applicator. For example, in FIG. 5 the guide pin is shown in raised position with respect to the cone 58, leaving a space generally indicated at 63. For freedom of movement of the pin, the pressure in the areas 63 should be equalized with the pressure imposed upon the structure through pneumatic line 8 and existing in pressure chamber 39. Because of the referred to grooves 62 around the periphery of the pin 60, and at that portion thereof shown in FIGS. 4 to 6, this function is accomplished.

At its lower end the cone 55 is dished as at 68, thus to provide a rim 70. The purpose of this rim is as follows: To afford a surface upon which the cone 55 may rest or re-seat, as same is shown in FIGS. 4 and 5. On the other hand, this rim 70 provides a contacting surface against which the grooved object to be fitted with an O ring is pressed, thus to raise the cone 55 to the position shown in FIG. 6. As a seat for support of the cone when at rest, the lower portion of the threaded element 12 is provided with a peripheral inner flange 72. The proportioning of the flange is somewhat critical: It extends inwardly enough to intersect about one-half of the rim 70, thus providing a small peripheral and inwardly facing edge or protrusion upon which that rim, and consequently the cone 55, is seated when in the "at rest" position. On the other hand, the peripheral flange 72 does not extend inwardly that distance which would preclude contact of the grooved object 75 with the rim 68, or provide a diameter less than the diameter of the grooved object to be fitted with the O ring. Stated in another way, the inner peripheral flange 72 intersects a part of rim 70 but the diameter of the area circumscribed thereby is greater than the diameter of the grooved object 75, thus permitting the latter to pass through the flange 72, to contact the rim 70, and to consequently, upon upward movement, transport the cone 55 vertically a corresponding distance.

Of course the grooved object 75, of whatever type it may be, but here taking the round form shown, must be carried upon a reciprocating element 80 to which it is removably affixed only for the purpose of receiving the O ring, at which juncture it is removed, and replaced, mechanically or manually, by another grooved object to be similarly fitted.

Reciprocations of the element 80 are in timed sequence with movements of the shuttle, this through ordinary mechanical, electrical, hydraulic, or pneumatic media which forms no part of this invention but which can easily be constructed and arranged for this purpose by those skilled in the art.

A further element of construction desirable for proper operation of the unit of the invention is found in the configuration of the rim 70. It will be noted that the opposed surfaces of bell 52 and cone 55, and as stated above, are in parallel relationship to each other, yet from top to bottom (viewing, e.g., FIG. 4) the conically disposed passageway 57 which is provided as a result of this positioning of these structures gradually enlarges with respect to its circumference from top to bottom. At the top of passageway 57, and as seen in FIG. 3, that passageway represents a circular one having the same inner and outer diameters as the O ring, thus to accommodate the O ring. However, upon application of air pressure to the upper side of the O ring the latter is forced downwardly over the expanding circumference of the cone 55, with the O ring itself sealing passageway 57 and, hence, being driven downwardly to the position shown in FIGS. 4 and 5. At its lower end, however, the air passageway is bent slightly to assume a vertical position; this is because the inner periphery of the threaded element 12 at that point, as indicated at 82, is parallel to the longitudinal axis of the unit; similarly, the outside periphery of the rim 70, here indicated at 84, is likewise disposed parallel to the axis, with the channel lying therebetween, 85, comprising a circular passageway, parallel to the longitudinal axis of the device, and having parallel sides adapted to accommodate the ring O in its expanded condition.

The purpose of the arrangement just described is to permit the O ring to be retained in a static position as shown in FIGS. 4 and 5 upon upward movement of the cone 55 as impelled by the grooved object 75. With the side walls of the peripheral passageway 85 being vertical, upward movement of the cone 55 will not result in corresponding upward movement of the ring O, but the latter will be retained in the position shown in these figures until the object has traversed a distance upwardly to a point opposite or substantially opposite that of the ring O. At that instant, the latter will snap upon the groove provided in the object 75. This latter and final function is illustrated in FIG. 6.

It is of course necessary at the start of the operation, as depicted in FIG. 3 with the ring O at the top of the cone, that downward motion of the latter be unrestricted, and to this end one or more apertures or holes 90 are provided in the peripheral flange 72. In other words, these permit downward movement of the O ring throughout its travel from uppermost to lowermost position without any impedance or obstruction due to build up of air pressure or back pressure on the opposite and lower side of the O ring. These openings 90 thus resolve that possible difficulty.

There may be some leakage of air between the gaskets or seals 44, 45, and the respective upper and lower surfaces of the reciprocable shuttle. Any such air emission is ventilated, if through the upper seal 44, by means of a series of bores 92. Leakage through the lower seal 45, if any, is disposed of through a series of apertures 95, positioned in the lower extension 10 of the casing 4.

From the foregoing description, the operation of the invention should be apparent to those skilled in the art. This operation is as follows:

The shuttle feed bar 18, provided with the referred to circular opening 20, is adapted to receive through an appropriate escapement media, a successive and sequentially received number of individual O rings, these to be installed upon the grooved product or element, as here indicated the circular object 75. Air under pressure is admitted through line 8, the air pressure being preferably in the neighborhood of 60 to 80 p.s.i. It is emitted into what might be termed a pressure chamber, represented by the bore 39. Upon motion of the shuttle bar from the position of FIG. 2 to the position of FIG. 3, and carrying the O ring along with it, the latter is juxtaposed immediately below and in alignment with the opening or chamber 40, the ring thus being subject to the elevated air pressure of the pressure chamber 39. Air pressure from chamber 39 forces the O ring over the inner cone 55 and downwardly through the passageway 57 into a position as shown in, e.g., FIGS. 4 and 5. By this procedure the O ring is gradually stretched over the cone 55, whereby at its lowermost position it has been expanded to the desired size for emplacement upon object 75. During its travel downwardly the O ring itself maintains an airtight seal between the outer surface of the cone 55 and the inner surface of the exterior bell 52, thus to seal passageway 57, the pressure in the chamber above the ring thus remaining constant and within the range of 60 to 80 p.s.i., as stated.

The object 75, provided with an appropriate groove to receive the O ring, is then moved upwardly by means of the timed reciprocating element 80. Object 75 first makes contact with the extension 15 of pin 60, forcing the latter vertically into the bore 39, which operation in extending the pin upwardly causes the pin 60 to perform as a guide for the cone 55 during the latter's movement. After the pin 60 has been forced upwardly a predetermined distance (as indicated in FIG. 5), the object 75 passes through the opening circumscribed by flange 72, contacts the inner peripheral edge of the lower rim 70 of the cone 55, and thereby projects the cone upwardly as guided on the pin 60. This permits the O ring to escape from its position shown in FIG. 5 and thus to be snapped into the groove provided in the object 75.

After withdrawal of the object, or upon reverse movement of the timed element 80 downwardly, the cone 55, guided as stated on pin 60, is reseated into its nest, i.e., seated upon the peripheral flange 72, as heretofore described. The pin then returns into normal position, that position being illustrated in FIG. 4. The shuttle, by suitable means, is automatically returned to its initial position, as illustrated in FIG. 2, thus closing pressure chamber 39. The shuttle is then in a position to receive an additional O ring, and the cycle is completed.

As stated in the foregoing, lateral reciprocation of the shuttle and vertical reciprocation of the object feed means 80 is in timed sequence and accomplished through media which can be readily designed by those skilled in the art, so that the entire operation is automatic. Furthermore, the operation contemplates high speed emplacement with consequent substantial reduction in what ordinarily would constitute a time consuming and thus much more expensive manipulation. Additionally, the device of the invention represents the optimum of simplicity and, as accentuated in the foregoing, resultant upon the need of but very few moving parts. Such essential factors are conducive to ready repair, replacement and, of course, reduction in cost of manufacture.

Other obvious alternates and expedients will be apparent to those skilled in the art upon consideration of the foregoing disclosure; however, the invention is not to be limited except as by such limitations as may appear in the claims appended hereto.

We claim:

1. A device for seating annular-like resilient objects on receiving elements, comprising a housing having an air pressure chamber therein, means for admitting air under pressure to said chamber, a slidable, reciprocating feed bar below said chamber arranged to sequentially subject said objects to pressure from said chamber, an air passageway of conical configuration having the smaller end thereof adjacent said feed bar whereby said objects are sequentially forced into said passageway to the opposite, enlarged end thereof to thereby expand the size of said objects, and reciprocable means adapted to sequentially feed elements receiving said objects to said enlarged end and in timed relationship with said slidable feed bar, whereby said expanded objects are sequentially disposed upon said receiving elements.

2. The invention as defined in claim 1 wherein said passageway comprises the inner wall of a cone shaped bell and the outer wall of a cone shaped member positioned within said cone shaped bell.

3. The invention as defined in claim 2 wherein said cone shaped member is axially disposed within said bell, reciprocably mounted with respect thereto, and subject to movement toward said pressure chamber upon contact by one of said receiving elements, thereby to position said object directly opposite one of said receiving elements when said element is forced to said enlarged end.

4. The invention as defined in claim 3 wherein a guide member is disposed within and in slidable relationship with said cone shaped member, whereby said cone shaped member is axially reciprocable thereupon when forced toward said pressure chamber by said receiving elements.

5. The invention as defined in claim 4 wherein said slidable feed bar is provided with means to limit the extent of reciprocating movement thereof, whereby at one side of said reciprocation said bar is in an object receiving position, and at the opposite side of said position, said feed bar places said object in an air pressure receiving position.

6. A mechanism for automatically implanting a ring-like elastic element within the groove of a grooved piece comprising the combination of:
 (a) a housing containing a pressure chamber having air directing means in connection therewith,
 (b) a reciprocating shuttle under said chamber having an elastic element receiving means therein,
 (c) means to reciprocate said shuttle from a position adapted to receive said element to a position in communication with said air directing means,
 (d) means to expand said element comprising an air passageway of about the same size and shape as said elastic receiving end thereof and gradually increasing in diameter to an enlarged configuration complementary to the size and shape of said grooved piece at the opposite end thereof,
 (e) means to position said grooved piece at a position within and opposite said enlarged configuration, and
 (f) means to admit air under pressure to said pressure chamber, whereby said elastic element is driven by pneumatic pressure through said passageway to seat into said grooved piece.

7. The invention as defined in claim 6 wherein said means to expand said elastic element comprises a bell having a hollow interior cone configuration and an additional cone within said bell and spaced from the interior wall thereof to form said air passageway of gradually increasing diameter.

8. The invention as defined in claim 7 having automatic means to feed said elastic elements to said element receiving means in timed sequence, and said means to reciprocate said shuttle is operated in timed relationship with said automatic means.

9. The invention as defined in claim 8 wherein means is provided to feed said grooved piece into said enlarged configuration when said elastic element is at said position of enlarged configuration in timed relationship with said shuttle reciprocating means.

10. The method of mounting an expandible, resilient annular ring-like device within an annular, external groove of a groove containing object comprising sequentially positioning a plurality of said devices within the entrance of an annular and cone-shaped passageway, said entrance being of cross-sectional size equivalent to the annulus of said device, said passageway terminating in an annular exit of cross-sectional size equivalent to that of each of said objects, sequentially admitting air under pressure above said device to thereby pneumatically force said devices to said exit, and expand same and in sequence timed with the positioning of said devices at said exit, placing said objects within said annular exit opposite said expanded devices, and forcing said expanded devices from said passageway at the exit thereof by continuing said pneumatic pressure to seat said devices into the external groove of said groove containing objects.

References Cited

UNITED STATES PATENTS

| | | | |
|---|---|---|---|
| 979,438 | 12/1910 | Courtney | 29—235UX |
| 1,830,814 | 11/1931 | Thiry | 29—235X |
| 2,263,690 | 11/1941 | Bradley | 29—235 |
| 2,814,858 | 12/1957 | Erdmann | 29—229 |
| 3,036,371 | 5/1962 | Gray et al. | 29—235 |
| 3,101,528 | 8/1963 | Erdmann | 29—229X |

FOREIGN PATENTS

| | | | |
|---|---|---|---|
| 115,063 | 4/1918 | Great Britain | 29—235 |
| 142,863 | 10/1960 | Russia | 29—450 |

CHARLIE T. MOON, Primary Examiner

U.S. Cl. X.R.

29—229, 235